Nov. 11, 1958    C. L. McIVER    2,859,643
MACHINE BED AND WAYS
Filed Oct. 20, 1953
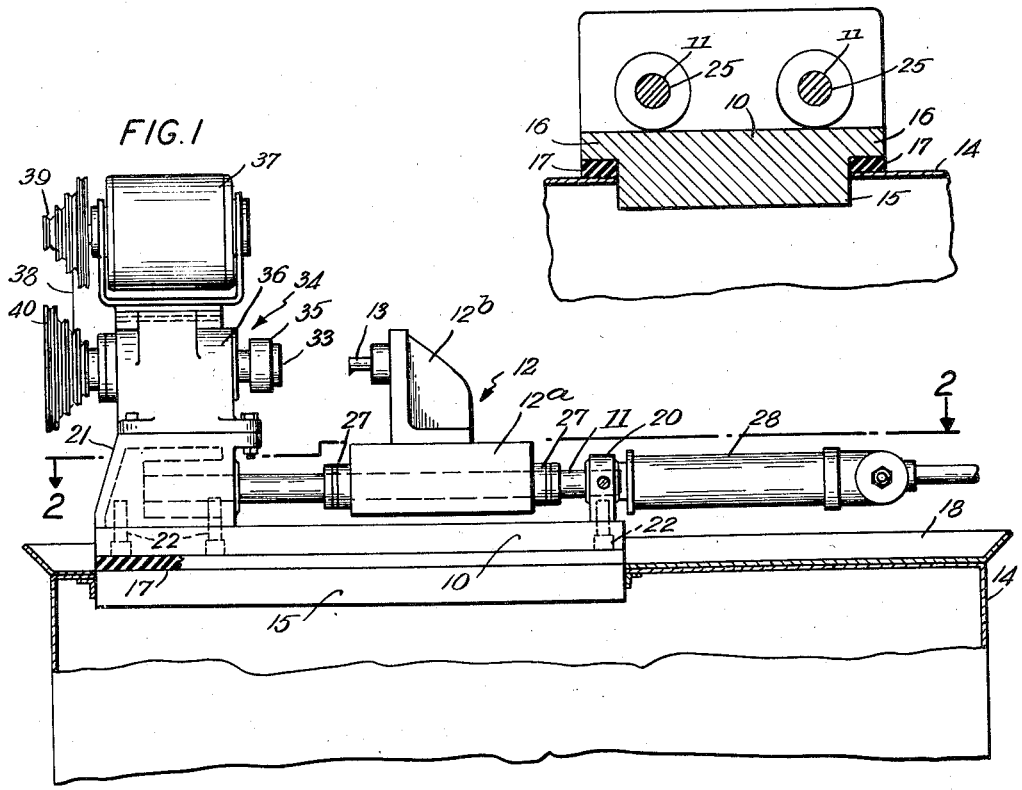
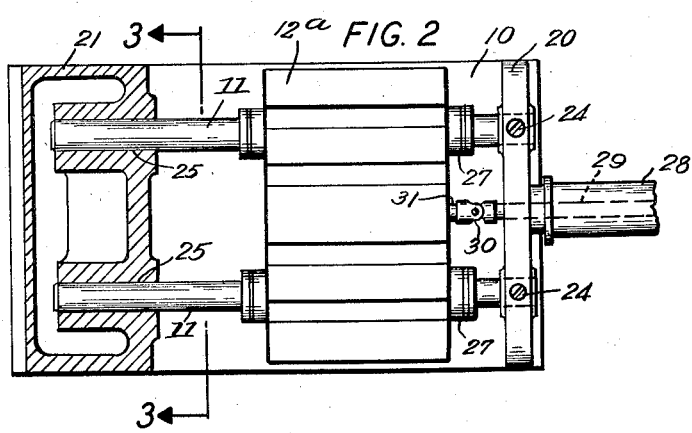
INVENTOR
CLEMENT L. McIVER
BY
Pike, Thompson and Sanborn   ATT'YS.

United States Patent Office 2,859,643
Patented Nov. 11, 1958

2,859,643
MACHINE BED AND WAYS

Clement L. McIver, Wayland, Mass., assignor to Atlantic Instrument Corporation, Norwood, Mass., a corporation of Massachusetts Application October 20, 1953, Serial No. 387,170

1 Claim. (Cl. 77—3)

The present invention relates to precision machine tools in which either a work support or tool support is movable on ways and more particularly to a bed and ways for such a machine.

In present types of machine tools, particularly those having a moving work or tool support, the accuracy of the work they produce is reduced by changes in the temperature of the environment above or below the temperature for which the machine was designed. This reduction of accuracy is due in part to warping or buckling of the bed and ways of the machine caused by thermal expansion or contraction of the material of which they are made.

The bed and ways of a machine are usually made of cast iron or steel and in some cases the bed is made of concrete. The coefficient of expansion of these materials is sufficient to vary the accuracy of precision machines.

In some machines the ways are integral with the bed, being grooves or ridges formed in the bed, and temperature changes disrupt the alignment of the parts due to thermal expansion or contraction of the bed. In others the ways are separate members attached to the bed at both ends and the parts of the bed and ways are thus normally of different masses and perhaps also of different materials. The smaller parts respond to changes in the temperature of the environment sooner than the larger so that the respective parts expand or contract at different rates which causes buckling. Also, different materials have different coefficients of expansion and when they are connected they will buckle with temperature changes.

When the parts become bulged or warped the accuracy of the machine is reduced. For example, in a boring machine in which the work is carried to the tool on a work support mounted on ways which are attached to the bed at the ends, an increase in the temperature of environment above the normal will cause the ways to expand faster than the bed and buckle.

Then, as the workpiece is moved over the buckled ways during the boring stroke, the hole bored is crooked and uneven to the extent of the buckling.

In machine shops which must do work within fine tolerances, warping and buckling of the beds and ways of the machines is kept within allowable limits by maintaining the temperature in the shop constant. However, this requires intricate and expensive air conditioning and control systems which greatly increase the cost of producing precision work.

The present invention provides a combination of bed and ways for a precision machine which will not warp or bulge with temperature changes. It makes possible the production of precision work pieces within uniformly fine tolerances without having to provide a controlled temperature environment. Therefore, precision work pieces of uniform quality may be produced much more economically than at present.

In addition precision machines constructed and arranged according to the present invention are simpler and more economical to build than present types of precision machines.

It is to be understood that the present invention may be applied in a variety of machine tools, without departing from the spirit of the present invention, which is shown in connection with a boring machine for illustrative purposes only.

Further objects and advantages will be apparent from the following description and accompanying drawings in which:

Fig. 1 is a side elevation partly in section of a machine tool embodying the present invention;

Fig. 2 is a section along the line 2—2 of Fig. 1; and

Fig. 3 is a section along the line 3—3 of Fig. 2.

Referring now to the drawings, the present invention comprises generally the structure and arrangement of a bed 10 and ways 11 of a machine tool in which a support element such as the tool support 12 for a tool 13 is slidable on the ways 11.

The bed 10 is a slab of granite supported on a casing 14. As seen in Fig. 3 a bottom portion 15 of the bed extends through an appropriate opening in the top of the casing and shoulder portions 16 of the bed rest on rubber cushions 17 which are attached on top of the casing to provide a cushion support for the bed. An upturned edge 18 around the top of the casing forms a catch basin with the top of the casing to collect coolant applied to the tool 13 in the operation of the machine.

The bed 10 being of granite provides a stable platform which for practical purposes is unresponsive to temperature changes in that it does not warp and its coefficient of linear thermal expansion is so small as to be non-existent. The positions of parts of the machine which are attached to the bed are not moved by its reaction to temperature changes to an extent which will change the precision of the work done by the machine. The coefficient of linear thermal expansion of granite is $8.3 \times 10^{-6}$, whereas cast iron at a temperature of 40° C. has a coefficient of linear thermal expansion of $10.61 \times 10^{-6}$. Cement and concrete have a coefficient of 10 to $14 \times 10^{-6}$.

Granite is igneous rock composed of mineral material of crystalline texture and it is strong and heavy so as to withstand vibration. There are no internal stresses in it to cause it to warp, because it cooled from molten condition millions of years ago and the stresses have long since disappeared by aging.

It will be appreciated that the structure of granite and its properties, such as its low coefficient of expansion compared with iron, steel and cement and the fact that it will not warp as does iron or steel, may be duplicated in other materials or compositions without departing from the spirit of the present invention. However, granite is a particularly suitable material because it is abundant in nature and needs only to be cut to the desired shape and size.

The parts of a machine mounted on the granite bed 10 will ordinarily be made of steel or some other metal which will expand or contract as the temperature changes. However, the bed 10 provides an unvarying dimension and the ways 11 and associated parts constructed and arranged relative to it according to the present invention eliminate harmful effects of expansion and contraction of these parts.

The ways 11 which are shown as being cylindrical extend between a base member 20 and a base member 21. The base members 20 and 21 are attached on the bed 10 by screws 22 through the bed into the bottom of the respective base members. At one end the ways 11 are fixed to the base member 20 by being secured in appropriate holes in base member with screws 24. At the other end the ways are fitted into holes 25 in base member 21. As shown in Fig. 2 the internal structure of the base member 21 is such that the depth through the holes is greater than the length of the ends of the ways 11 which extend into them. Therefore, the ways 11 not being attached in the holes 25 are free to expand and contract longitudinally in the base member 21 so that they do not buckle between the base members as they become heated when the temperature of the environment of the machine increases.

The ends of the ways 11 fit in the holes 25 with a honed fit which has proved to be sufficiently tight to hold the ways firmly in position over a wide range of temperatures ranging from cold to hot. That is, the fit does not loosen and permit the ways to wobble out of line under cold working conditions and does not bind and cause the ways to buckle under hot working conditions.

The tool support 12 comprises a slide 12a on which a head 12b carrying the tool 13 is mounted. The ways 11 are passed through appropriate holes in the slide and bushings 27 attached in the ends of the holes slidably support the slide on the ways. The slide 12a is attached by a universal joint 30 and shank 31 to a piston rod 29 of an air cylinder 28 which, when actuated by compressed air means (not shown), feeds the slide along the ways.

The tool support 12 moves along the ways 11 and carries the tool 13 into contact with a workpiece 33 which is rotated on a work support 34. The work support 34 is mounted on the base member 21 and comprises a rotating draw chuck 35 to hold a work piece and a head 36 through which the draw chuck is supported. A motor 37 rotates the chuck 35 through a V-belt 38 and pulleys 39 and 40.

The base members 20 and 21 each comprise material having substantially the same coefficient of thermal expansion and they maintain the opposite ends of the ways 11 and also the work and tool centers at equal height above the bed. Therefore, vertical expansion or contraction of the base members will raise or lower the ends of the ways 11 and also the work and tool centers by the same amount and the ways will thus remain parallel to each other and to the bed. As previously described, the ways 11 are arranged so as to expand and contract longitudinally without distortion. In this way the machine remains in accurate alignment for precision work regardless of changes in the temperature of the environment.

The above described invention has proved to be particularly well adapted to boring machines for processing small parts within fine tolerances, but it may equally well be applied to other types of machines which have a support member movable on ways or tracks. Also, it will be understood that certain changes and variations may be made in the above described preferred embodiment without departing from the spirit of the invention.

What I claim as my invention is as follows:

A precision machine tool, comprising a casing having an opening in the top wall thereof, a bed comprising an elongated granite slab having a central portion projecting through said opening and having opposite side shoulder portions spaced from said top wall, rubber cushions disposed between said shoulders and said top wall of the casing, a first base member secured to one end of said bed, a second base member secured to the opposite end of said bed, a pair of guide ways disposed above said bed in parallel relation thereto and having corresponding ends thereof secured to said first base member, said second base member having a pair of bores in which the opposite ends of said guide ways are freely supported, a tool support slidably mounted on said guide ways, and a work support mounted on said second base member.

References Cited in the file of this patent

UNITED STATES PATENTS

| | | |
|---|---|---|
| 353,302 | Goodwin | Nov. 30, 1886 |
| 1,193,981 | Boyd | Aug. 8, 1916 |
| 1,716,362 | Billingmann | June 11, 1929 |
| 2,010,557 | Nenninger | Aug. 6, 1935 |
| 2,048,634 | Keller | July 21, 1936 |
| 2,082,324 | Crafts et al. | June 1, 1937 |
| 2,155,747 | Wood | Apr. 25, 1939 |
| 2,312,291 | Tyson | Feb. 23, 1943 |
| 2,356,641 | Wolfle | Aug. 22, 1944 |
| 2,389,556 | Siegerist | Nov. 20, 1945 |
| 2,538,228 | Blair | Jan. 16, 1951 |
| 2,601,630 | Rahn | June 24, 1952 |

FOREIGN PATENTS

| | | |
|---|---|---|
| 426,434 | Great Britain | Apr. 3, 1935 |

OTHER REFERENCES

American Machinist, page 229, January 4, 1945.
American Machinist, page 148, June 3, 1948.
Scientific American, page 136, March 1944.